United States Patent [19]

Ayres

[11] 3,951,801

[45] Apr. 20, 1976

[54] SERUM/PLASMA SEPARATOR-STRUT STOP TYPE

[75] Inventor: Waldemar A. Ayres, Rutherford, N.J.

[73] Assignee: Becton, Dickinson and Company, East Rutherford, N.J.

[22] Filed: Feb. 27, 1974

[21] Appl. No.: 446,349

[52] U.S. Cl. .......... 210/117; 210/516; 210/DIG. 23

[51] Int. Cl.[2] .......... B01D 21/26

[58] Field of Search .......... 23/230 B, 258.5, 259, 23/292; 128/214 R, 272; 210/83, 84, 109, 131, 359, 514–518, DIG. 23, DIG. 24, 117; 233/1 A, 1 R, 26

[56] References Cited

UNITED STATES PATENTS

| | | | |
|---|---|---|---|
| 3,508,653 | 4/1970 | Coleman | 210/DIG. 23 |
| 3,706,305 | 12/1972 | Berger et al. | 23/258.5 X |
| 3,741,400 | 6/1973 | Dick | 210/516 |
| 3,786,985 | 1/1974 | Blaivas | 210/DIG. 23 |

FOREIGN PATENTS OR APPLICATIONS

| | | | |
|---|---|---|---|
| 1,504,514 | 12/1967 | France | 128/272 |

*Primary Examiner*—Thomas G. Wyse
*Assistant Examiner*—Robert H. Spitzer
*Attorney, Agent, or Firm*—Kane, Dalsimer, Kane, Sullivan and Kurucz

[57] ABSTRACT

A blood collection and separator assembly of the type suitable for use in centrifuging blood to separate the plasma or serum, the light phase, from the cellular portion, the heavy phase. The assembly includes a collection container and a piston disposed therein for sealing off one phase from the other after centrifuging is terminated. The piston is formed having an average specific gravity heavier than the light phase of the blood. The piston is slidably disposed in the container with its outer surfaces in sealing contact with the inner surface of the container and is provided with means which, under centrifugal force, permit the light phase of the blood to pass the piston as the piston moves down through the light phase while retaining sealing engagement with the inner surface of the container. The piston is provided with means to stop the piston at a predetermined distance above the bottom of the container whereupon the piston can serve as an impervious barrier between the two phases of the blood.

5 Claims, 2 drawing Figures

SERUM/PLASMA SEPARATOR-STRUT STOP TYPE

BACKGROUND OF THE INVENTION

It is known to separate blood into its component parts by centrifugation, for example, the assembly disclosed in U.S. Pat. No. 2,460,641. However, this particular assembly does not employ a means for sealing the separated plasma or serum phase from the cellular phase.

It is also known to provide assemblies for manually separating the plasma or serum phase from the cellular phase, for example, as disclosed in U.S. Pat. Nos. 3,586,064; 3,661,265; 3,355,098; 3,481,477; 3,512,940; and 3,693,804. In all of these devices the serum is collected in a blood collection container and means are provided for separating the plasma or serum phase from the cellular phase employing filters, valves, transfer tubes or the like.

It is also known to provide assemblies for the sealed separation of blood in which a piston is actuated by centrifugal force such as is disclosed in U.S. Pat. Nos. 3,508,653 and 3,779,383. These devices use either a distortable piston made of resilient material or valve means associated with the piston to effect a sealed separation after centrifugation.

SUMMARY OF THE INVENTION

It is an object of the present invention to provide a serum plasma separator assembly including a collection container and a piston slidably disposed in the container, which piston has means permitting, under centrifugal force, the light phase of the blood to pass the piston as the piston moves through the light phase, means to stop the piston at a predetermined distance above the bottom of the container, and means to seal the piston in the container slightly above the plasma serum-cellular interface.

It is another object of the invention to provide a serum plasma separator assembly which is economical to manufacture and can be used in conjunction with standard blood collecting equipment.

DESCRIPTION OF THE DRAWINGS

For a better understanding of the invention, references are made to the drawings which illustrate the preferred embodiment of the invention herein.

DESCRIPTION OF THE PREFERRED EMBODIMENTS

Figure 1:
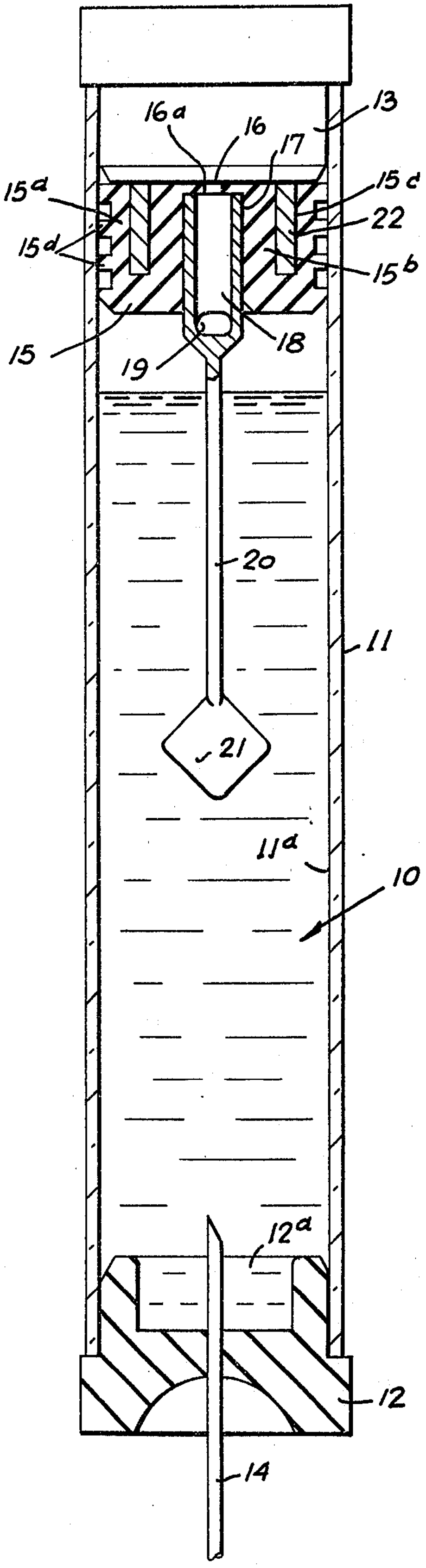
FIG. 1 is a sectional, elevational view showing the plasma serum separator assembly of the present invention and also illustrating a pointed cannula penetrating one of the stoppered ends of the container through which blood is introduced into the container prior to its separation.
Figure 2:
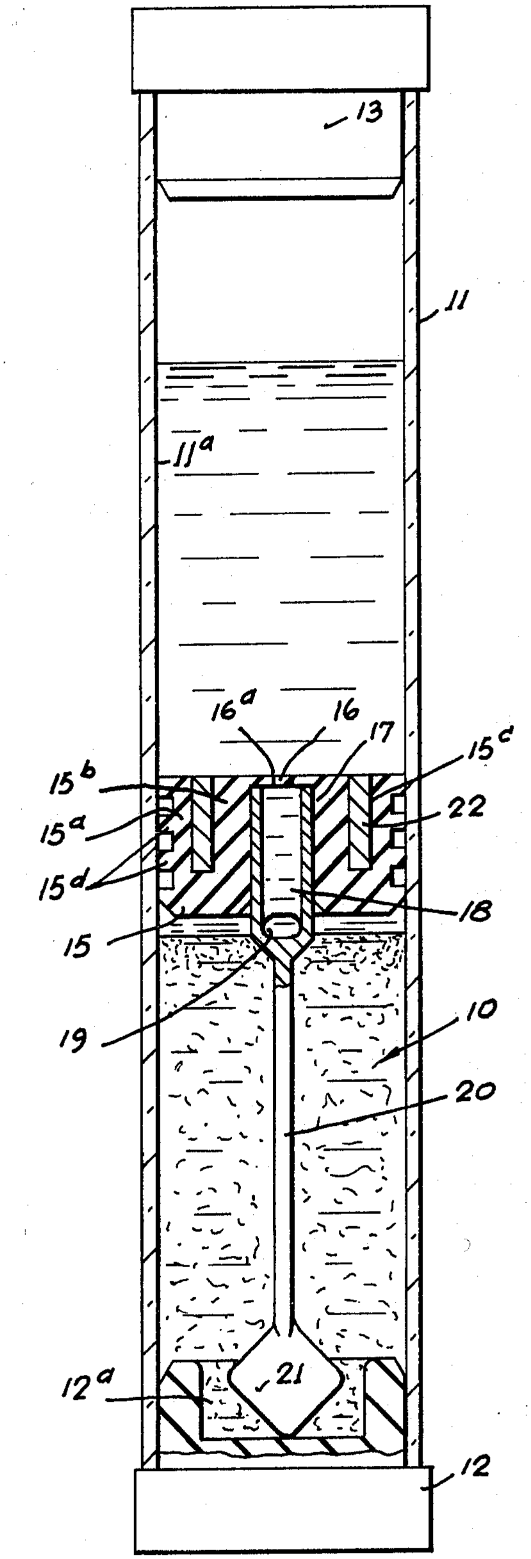
FIG. 2 is a sectional, elevational view similar to the view of FIG. 1, showing the piston stopped at a predetermined distance above the bottom of the container determined by the length of the strut affixed to the piston, the said piston sealing the container slightly above the plasma serum-cellular interface.

For a better understanding of the invention herein a description of the drawings of the illustrative embodiments is had with particular reference to FIGS. 1 and 2.

In FIG. 1 the separator assembly 10 comprises a tubular member or container 11 which is sealed at its open ends by closure members 12 and 13. Such tubular member or container is preferably formed of glass but any other suitable material may be employed. Closure members 12 and 13 are preferably made of rubber or other preferred elastomer and are capable of being penetrated by a cannula 14 so that the blood can be transferred from a blood source into the container under aseptic conditions. The closures 12 and 13 are preferably made of resilient material and should be self-sealing so that when the cannula is removed from the closure 12 there will be no loss of blood passing through the penetration portion of closure 12 illustrated in FIG. 1.

Disposed in container 11 is piston 15 which is preferably made of an elastomeric material and is made to provide an interference fit relative to container 11. The piston is formed having a specific gravity heavier than the light phase of blood. When the assembly is centrifuged, after cannula 14 is removed, piston 15 will move downwardly through the plasma/serum phase from the initial starting position illustrated in FIG. 1 to the terminal position after the separation of the light phase from the heavy phase, as shown in FIG. 2.

The elastomeric portion of piston 15 comprises an outer wall **15*a* and spaced therefrom is inner wall 15*b* in which their respective wall surfaces define annular recess 15*c*. Formed integrally with wall 15*a* are a plurality of axially spaced resilient sealing rings 15*d* which contact the inner wall surface 11*a* of container 11 in sealing engagement. Piston 15 when mounted in container 11 will maintain sealing contact with inner wall 11*a* of container 11 throughout its path of travel within container 11. During the centrifuging operation when increased speed is used piston 15 is subjected to centrifugal forces which start to move it downwardly. This movement establishes a pressure differential on the two sides of the top wall or diaphragm portion 16 of piston 15. The diaphragm 16 is made of relatively thin, stretchable or resilient material and lies adjacent and against stopper 13 in its initial position as seen in FIG. 1. Diaphragm 16 is provided with a plurality of normally closed apertures 16*a* extending therethrough. The piston 15 is provided with a cylindrical center recess 17 extending from the bottom to the under side of the diaphragm. Fitted into this recess is a sleeve 18 having a port 19 at its bottom end so that serum/plasma can flow during centrifugation from the container into the interior of the sleeve and out through the resilient apertures 16*a* of the diaphragm. Since the centrifugal force will thrust the piston 15 downwardly the light phase liquid will stretch diaphragm 16 upwardly and apertures 16*a* will automatically open and will enable the light phase liquid to pass upwardly through the opened apertures. This will enable piston 15 to move from its initial position of FIG. 1 to its final position of FIG. 2 while maintaining sealing sliding engagement with the inner wall 11*a* of container 11. The sleeve 18, which is part of strut 20, is mounted in recess 17. Strut 20 may be made of polyethylene, or other suitable material. The bottom end of the strut 20 has a bulb 21 which is slanted at its upper surface so that red cells will centrifuge off. The lower surface is also slanted and of sufficiently large diameter to be cammed into the center well 12*a* of the lower closure 12. The strut is of a predetermined length to stop the piston 15 at a predetermined distance from the bottom of the container. Such strut stop means will position the piston slightly above the serum/plasma-cellular interface. When piston 15 stops its downward movement in container 11** and comes to rest, the fluid pressure differential on the two sides of diaphragm 16 is substantially eliminated and aperture valve means 16*a* automatically closes even though the assembly is still being subjected to centrifugal forces.

Piston 15 as noted above includes tubular sleeve 22 which is mounted in the recess 15*c* with an interference fit with no air space therearound. Also, when piston 15 is subjected to centrifugal forces the radial outward thrust force of the increased pressure of the liquid is restrained by tubular sleeve 22 and will not be transmitted to resilient sealing rings 15*d* which would cause a major increase of friction between the piston 15 and the interior of glass tube 11 so that piston 15 might be prevented from sliding down as far as the strut 20 and bulb 21 would permit. Tubular sleeve 22 as noted above has such a specific gravity that it, plus the elastomeric piston, plus the strut 20 have an average specific gravity greater than blood and when subjected to centrifugal forces provide a large downward thrust, more than sufficient to overcome the friction of the multiple seal rings 15*d* of the piston relative to the glass tube plus the added work of opening the resilient aperture valve means.

As illustrated in FIG. 2, piston 15 has completed its travel within container 11 and is stopped from further movement in container 11 by stop means 20–21 and valve means 16*a* are closed. Also a portion of the light phase remains above the separated heavy phase and is not utilized as part of the separated light phase.

As an alternative one-way valve to the valve means provided by the port 19 and diaphragm 16, the sealing rings 15*d* can be replaced with very flexible sealing fins encircling the piston and in contact with the inner wall surface 11*a* of container 11. Such fins preferably slant in an upward direction so that when centrifugal force is applied the fins will yield and permit the liquid phase to pass by between the fins and the container wall. When the piston has reached its stopping point slightly above the interface, these flexible fins will form a seal relative to the inner wall 11*a* of the container 11.

When operating the separator assembly of the invention herein it is preferred that the assembly be evacuated so that when cannula 14 penetrates closure 12 blood will fill container 11 automatically. It is also contemplated to provide a separator assembly suitable for use with blood collecting assembly disclosed in U.S. Pat. Nos. 2,460,641, 3,469,572 and 3,494,352. It is important when filling the assembly 10 that blood be introduced into container 11 through the stopper 12 mounted on the bottom of the container to obviate the possibility of having blood cells trapped between the piston 15 and stopper 13.

After cannula 14 is withdrawn and container 11 is filled with blood the assembly is placed in a centrifuge and the blood is separated initially employing moderate centrifugal forces which do not cause the piston to move from its initial position. This precipitates or separates the blood cells or blood clot into the lower portion of container 11. Thereafter the rotational speed of the centrifuge is increased which causes a substantial downward thrust on the piston. As the piston starts to move it increases the hydrostatic pressure in the liquid ahead of it and stretches the diaphragm. This causes valve means 16*a* to open automatically and the piston moves downwardly through the light phase with the light phase passing up through the open valve means. Piston 15 maintains sliding and sealing engagement with the inner wall 11*a* of container 11. The piston completes its movement when the bulb 21 of the strut 20 comes into contact with the center well of the closure 12 and terminates the pressure differential at the bottom and top of the diaphragm and automatically closes the resilient aperture valve means even while the assembly is still subjected to centrifugal forces. Before centrifuging is terminated diaphragm 16 establishes an impervious barrier between the light and heavy phases of the blood when valve means 16*a* automatically closes on piston 15.

Then the centrifuge is stopped and the separated blood sample is ready for use. As desired, the serum or plasma can be taken from the top end and/or the concentrated red cells can be taken from the bottom end.

While variations of the invention herein may be had, the objectives of the invention have been illustrated and described.

What is claimed is:

1. A separator assembly, capable of separating blood into its component parts of plasma or serum and cellular portion comprising:

a. a container having at least one open end which is adapted to receive blood for subsequent separation into a light phase and a heavy phase;

b. a closure sealing the open end of the container, the closure being formed of a self-sealing elastomeric material which is penetrable by a cannula through which blood to be separated is conducted into the container;

c. a piston assembly having an average specific gravity greater than the blood and slidably mounted in the container and having means on an outer surface in sealing engagement with an inner surface of the container;

d. pressure responsive valve means associated with said piston, said valve means being normally closed when there is a minimum of pressure differential on different portions of the valve means and which automatically opens in response to a substantial pressure differential so that when said container is subjected to moderate centrifugal force the blood separates into its light phase and heavy phase but the piston stays in the upper portion of the container, and subsequently when increased centrifugal force is used the valve means automatically opens with light phase fluid passing up through the valve means enabling the piston to move down through the light phase while retaining sealing engagement with the inner surfaces of the container; and e. stop means comprising a strut projecting from the piston to contact the end of the container whereby the piston when moving through the light phase will stop a predetermined distance from the said end of the container followed by termination of the differential pressure which permits the valve means to automatically shift from an open position to a closed position to provide an impervious barrier between the separated light phase and heavy phase of the blood.

2. The separator of claim 1 wherein the said container comprises a tubular body open at each end in which closures formed of elastomeric material are mounted in sealing engagement with the tubular body and said piston is initially disposed adjacent one of said closures.

3. The separator of claim 1 wherein the piston includes at least one sealing ring on its outer portion for sealing engagement with the inner wall of the container, a diaphragm forming a wall across one end of the piston and having apertures formed therein which are normally closed but which automatically open when subjected to a substantial pressure differential on the opposite sides of the diaphragm, and means for the liquid phase to flow from the container to the diaphragm.

4. The separator of claim 1 wherein the pressure responsive valve means associated with the said piston comprises flexible sealing fins on the outer surface of the piston in sealing engagement with an inner surface of the container which fins are slanted in an upward direction and are adapted when centrifugal force is applied to the piston to permit light phase fluid to pass around the periphery of the piston when the piston moves down through the light phase.

5. A separator assembly capable of separating blood into its component parts of plasma or serum and cellular portion comprising:

a. a container for receiving blood and having at least one open end which is adapted to receive a closure for sealing the open end of the container, an elastomeric closure sealing said open end of the container;

b. a piston assembly having an average specific gravity greater than the blood and slidably mounted in the container and having means on an outer surface thereof for sealing engagement with the inner surface of the container;

c. pressure responsive valve means associated with the piston, said valve means being normally closed and being adapted to automatically open when subjected to a predetermined pressure differential when the piston is slidably moving within the container and which automatically close when the piston ceases movement to isolate a substantial amount of the plasma or serum from the cellular portion; and d. a strut affixed to the lower end of the piston for stopping the piston at a predetermined distance from the end of the container and assuring the isolation of the light phase of the plasma or serum and the cellular portion.

* * * * *